US006835034B2

(12) United States Patent
Winsor

(10) Patent No.: US 6,835,034 B2
(45) Date of Patent: Dec. 28, 2004

(54) METHOD AND SYSTEM FOR RESTRAINING ROAD VEHICLE ON A TRANSPORT VEHICLE

(76) Inventor: Robert Winsor, 3493 Atwater, Apt. 19, Montreal, Québec (CA), H3H 1Y2

(*) Notice: Subject to any disclaimer, the term of this patent is extended or adjusted under 35 U.S.C. 154(b) by 0 days.

(21) Appl. No.: 10/334,721

(22) Filed: Jan. 2, 2003

(65) Prior Publication Data
US 2004/0131438 A1 Jul. 8, 2004

(51) Int. Cl.[7] .................................................. B60P 7/08
(52) U.S. Cl. ............................................ 410/30; 410/7
(58) Field of Search ............................ 410/7, 9, 19, 30, 410/49; 188/32

(56) References Cited

U.S. PATENT DOCUMENTS

| 1,047,048 | A | * | 12/1912 | Harrison | 410/19 |
| 1,906,022 | A | * | 4/1933 | Tobin | 410/21 |
| 2,480,121 | A | * | 8/1949 | Cupp | 410/30 |
| 2,858,905 | A | * | 11/1958 | Fahland | 410/30 |
| 4,024,820 | A | * | 5/1977 | Hlinsky et al. | 410/3 |
| 4,786,223 | A | * | 11/1988 | Crissy et al. | 410/20 |
| 4,836,726 | A | * | 6/1989 | Robertson et al. | 410/9 |
| 4,838,743 | A | * | 6/1989 | Blunden et al. | 410/9 |
| 4,875,813 | A | * | 10/1989 | Moyer et al. | 410/9 |
| 5,037,255 | A | * | 8/1991 | Bullock et al. | 410/30 |
| 5,302,063 | A | * | 4/1994 | Winsor | 410/30 |
| 5,312,213 | A | * | 5/1994 | Winsor | 410/9 |

* cited by examiner

Primary Examiner—Stephen Gordon
(74) Attorney, Agent, or Firm—Ogilvy Renault; Guy J. Houle

(57) ABSTRACT

A method and a system including a catcher tire abutment device is described for restraining road vehicles transported on a support surface of a transport vehicle. Primary wheel restraining devices are secured to the support surface on outward sides of pairs of wheels of each road vehicle adjacent the thread surface of the wheels. A catcher tire abutment device is also secured to the support surface an approximate predetermined distance spaced adjacent the thread face on inward sides of front and rear pairs of wheels of the vehicle. When the road vehicles are subjected to an impact force, from either a front or rear direction, kinetic energy from the impacted vehicle is absorbed and dissipated softly in a sequential manner by (a) contact of the tires of one of the front and rear pairs of wheels against an arresting surface of the primary wheel restraining devices and (b) by the tires of the other pair of wheels contacting the arresting surface of the catcher tire abutment devices.

11 Claims, 5 Drawing Sheets

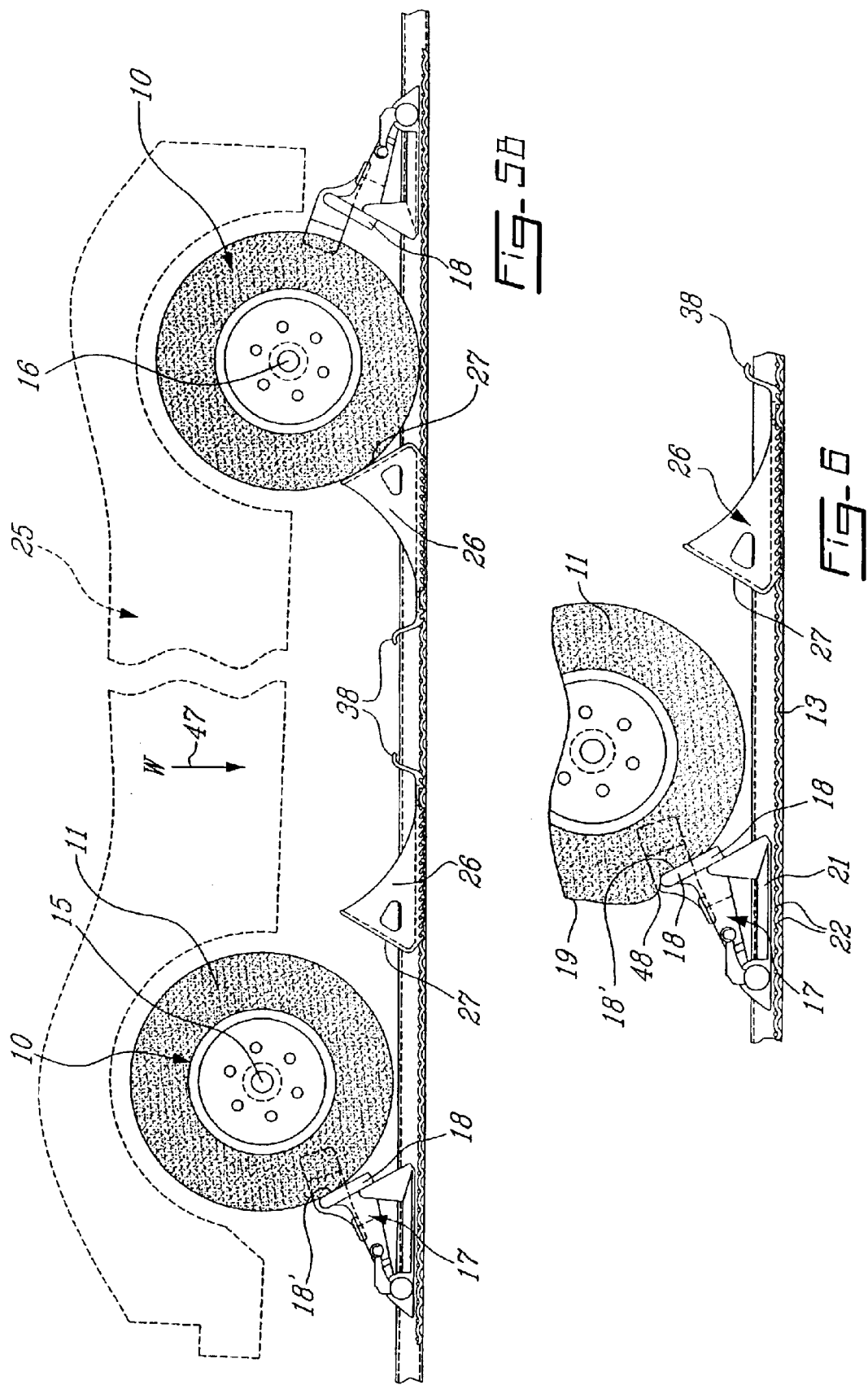

METHOD AND SYSTEM FOR RESTRAINING ROAD VEHICLE ON A TRANSPORT VEHICLE

TECHNICAL FIELD

The present invention relates to a method and a system as well as a catcher tire abutment device for restraining a road vehicle on a vehicle support surface of a transport vehicle and maintaining the transported road vehicle in a transport location when subjected to an impact force from either a front or rear direction.

BACKGROUND ART

References made to my earlier U.S. Pat. Nos. 5,302,063 and 5,312,213 which relate to a wheel chuck which is securable to a grating, of a transport vehicle to prevent axial displacement and lateral shifting motion of a road vehicle being transported. With these wheel chucks it is pointed out that it is not necessary to strap any wheel or tie down the vehicle by the use of chains connected to steel runners in the support surface, such as the floor of a railway flatbed vehicle. With many prior art devices, tools are required in order to secure these chains or straps to restrain the transported vehicle The wheel chucking system as described in my above referenced patents can be installed very rapidly onto a grating floor of transport vehicles. However, if the transport vehicle, such as a railway flatbed vehicle is subjected to an abrupt stop or starts abruptly or is impacted by other flatbed during interconnection, the transported road vehicles are subjected to an impact force from either a front or a rear direction. Because the road vehicles are not tied down it is possible that if this impact force is large enough that the vehicle could be dislodged from its transport location between the chucks by jumping over a pair of these chucks facing the direction of impact.

SUMMARY OF INVENTION

It is a feature of the present invention to provide a method and a system for restraining a road vehicle on a vehicle support surface of a transport vehicle by using primary wheel restraining devices i.e. the chucks of my above-referenced patents, and securing a catcher tire abutment device on an inward side of each tire of the front and rear pair of wheels of the road vehicle and sapced from its thread face.

Another feature of the present invention is to provide a catcher tire abutment device for use in combination with my aforementioned chuck system and wherein the catcher tire abutment device is secured to the flooring without the use of tools.

A further feature of the present invention is to provide a catcher tire abutment device as above-mentioned and which is lightweight, economical to produce and easy to install and remove from a flooring surface without the use of tools.

According to the above features, from a broad aspect the present invention provides a method of restraining a road vehicle on a vehicle support surface of a transport vehicle. The method comprises the steps of securing a primary wheel restraining device, having an arresting surface, to the support surface with the arresting surface thereof being adjacent a thread face of a tire of front and rear pairs of wheels of the road vehicle and on outward sides of the pairs of wheels thereby establishing a transport location of the road vehicle on the vehicle support surface between the four primary wheel restraining devices. The method also comprises securing a catcher tire abutment device, having an arresting surface, to the support surface with the arresting surface thereof spaced at an approximate predetermined distance adjacent the thread face on inward sides of each tire of the front and rear pairs of wheels. This method provides restraining the road vehicle in the transport location when the transported road vehicle is subjected to an impact force from either a front or rear direction by absorbing kinetic energy from the impacted transported vehicle sequentially by (a) contact of said tires of one of said front and rear pairs of wheels against the arresting surface of the primary wheel restraining device and (b) by the tires of the other pair of wheels contacting the arresting surface of the catcher tire abutment devices.

According to a still further broad aspect of the present invention when the tires of one of the front or rear pairs of wheels contact the arresting surface of the primary wheel restraining devices, the tires compress against the arresting surface whereby to absorb impact by deformation of the tires and wherein the arresting surface simultaneously cause the tires to move upward whereupon the weight of the road vehicle provides a downward restoring load to assist the road vehicle to return to the transport location when the arresting surface of the catcher tire abutment devices are contacted by the tires of the other pair of wheels. Accordingly, the shock is absorbed sequentially by delayed contact which includes time lapse provided by the road vehicle displacement, the tire deformation and the downward load buildup during upward movement of the tires on the arresting surface of the primary wheel restraining devices all of which provides for a soft dissipation of the kinetic energy of the road vehicle being displaced by an impact force.

According to a still further broad aspect of the present invention there is provided a system for restraining a road vehicle on a vehicle support surface of a transport vehicle. The system comprises providing, for each road vehicle, four primary wheel restraining devices having an arresting surface and securing means for attaching same to the vehicle support surface with the arresting surface positioned adjacent a thread face of a tire of front and rear pairs of wheels of the vehicle and on an outward side of the pairs of wheels thereby establishing a transport location of the road vehicle on the vehicle support surface between the four primary wheel restraining devices. The system also provides four catcher tire abutment devices also having an arresting surface and securing means for attaching same to the vehicle support surface an approximate predetermined distance adjacent the thread face on an inward side of each tire of the pairs of wheels. The approximate predetermined distance is calculated whereby the arresting surface of the catcher tire abutment device is contacted by the thread face of a pair of the wheels a predetermined time after a vehicle at the transport location has been subjected to an impact force to permit the arresting surface of the primary wheel restraining devices to be contacted first by the tires of the wheels of one of the front and rear pairs of wheels whereupon the tires compress against the arresting surface, to absorb impact by deformation of the tires, while causing the wheels of the vehicle to move upward whereby the weight of the road vehicle provides a downward restraining load to assist the road vehicle to return to the transport location when the arresting surface of the catcher tire abutment devices are contacted by the tires of the other pair of wheels.

According to a still further broad aspect of the present invention there is provided a catcher tire abutment device for use in a system for restraining road vehicles on a vehicle support surface of a transport vehicle. The catcher tire abutment device has a flat bottom wall and a rearwardly and upwardly extending arresting front surface. Securement arresting means project from the flat bottom wall and is adapted for release engagement with a vehicle support surface. A clamping means is spaced rearwardly of the flat bottom wall for engagement with the vehicle support surface. Means is also provided to engage and disengage the clamping means.

BRIEF DESCRIPTION OF DRAWINGS

A preferred embodiment of the present invention will now be described with reference to the accompanying drawings in which:

FIG. 5B is a view similar to FIG. 5A but showing how the vehicle is restrained by the method and system of the present invention when the vehicle is subjected to an impact force;

FIG. 6 is an enlarged section view showing the contact of a tire against an arresting surface of a primary wheel restraining device at impact with the wheel having moved upward on the arresting surface.

DESCRIPTION OF PREFERRED EMBODIMENTS

Figure 1:
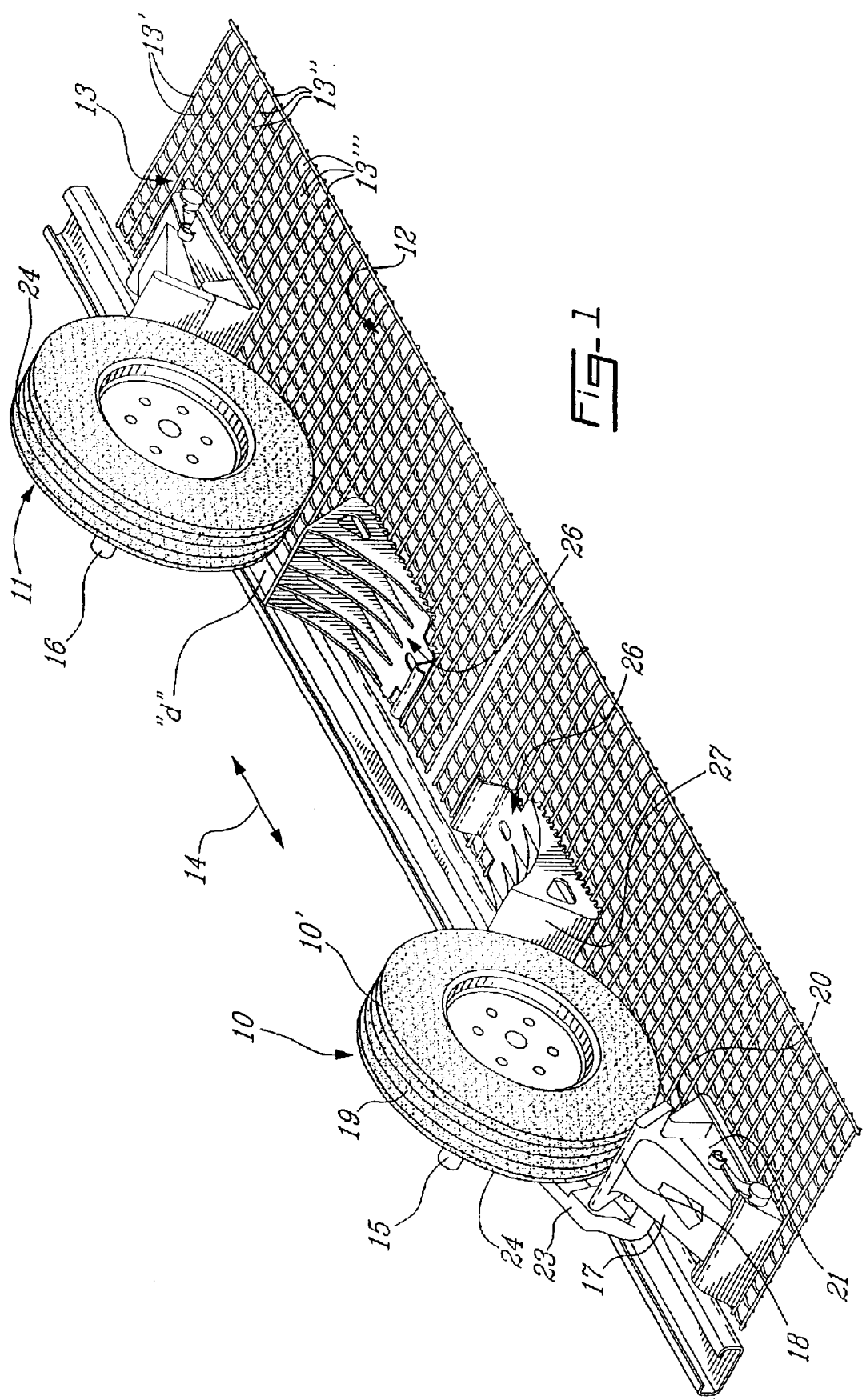
FIG. 1 is a perspective view showing a front and rear wheel of a pair of wheels of a road vehicle being restrained on a vehicle support surface of a transport vehicle by primary wheel restraining devices and catcher tire abutment devices, the latter constructed in accordance with the present invention.
Figure 2:
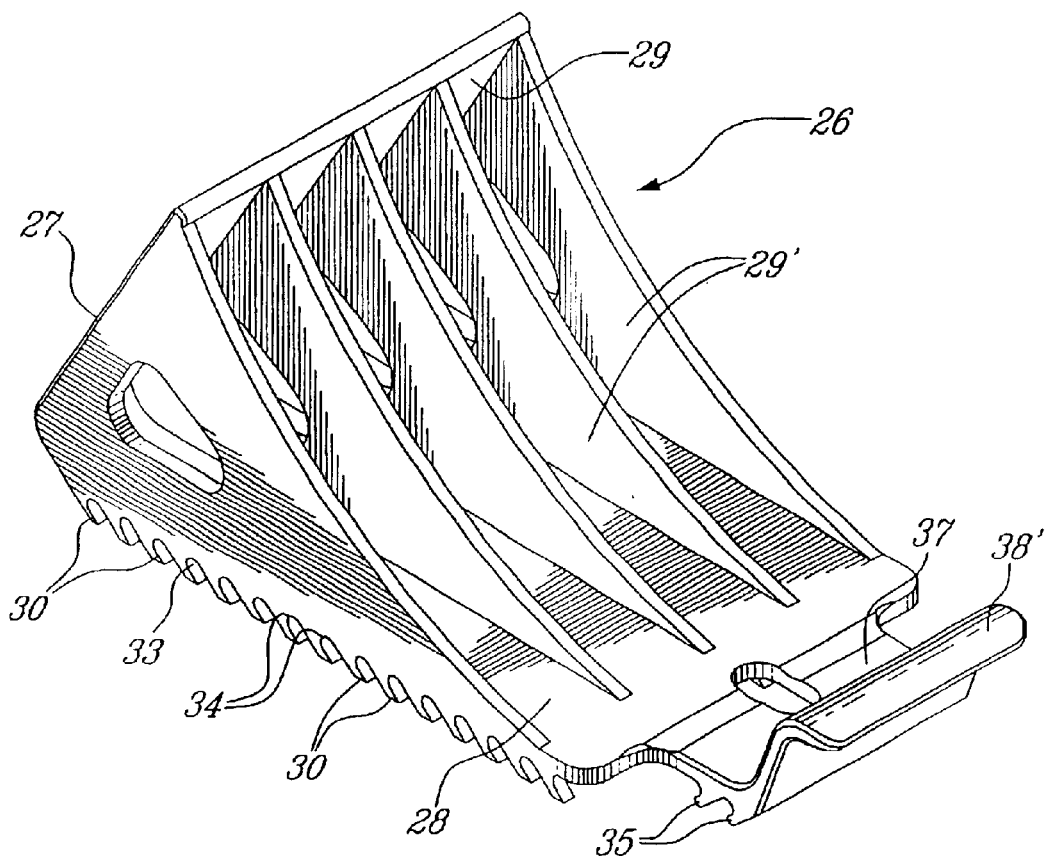
FIG. 2 is a top perspective view of the catcher tire abutment device of the present invention.
Figure 3:
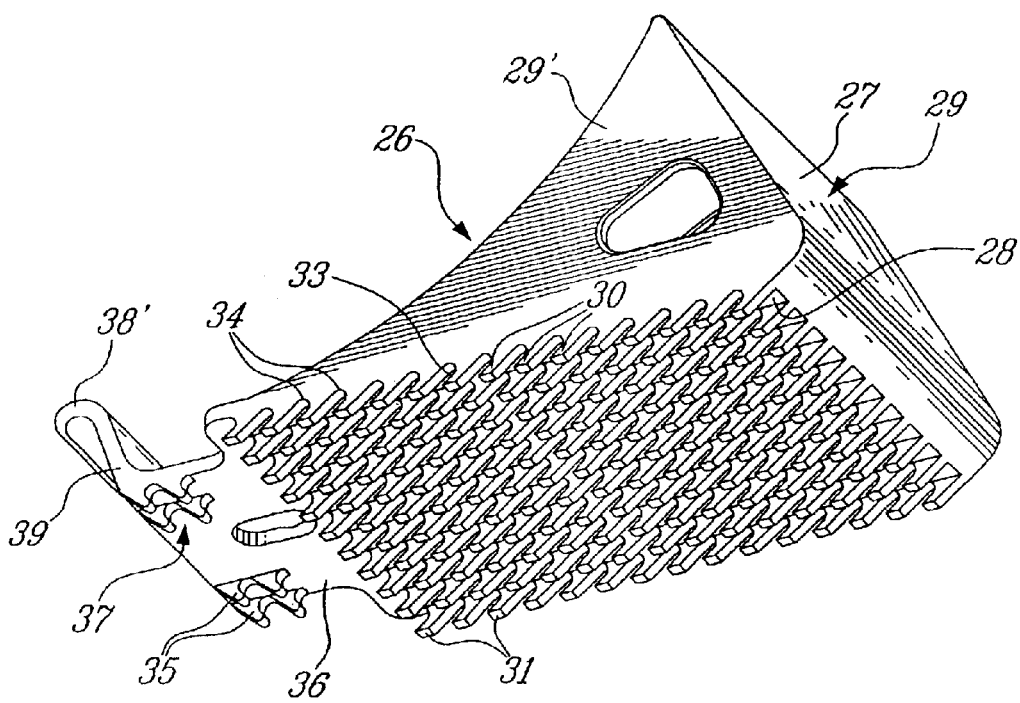
FIG. 3 is a bottom perspective view of the catcher abutment device of the present invention.

Referring now to the drawings and more particularly to FIG. 1 there is shown the front wheel 10 and rear wheel 11 of a front and rear pair or wheels of a road vehicle being transported on a support surface 12 of a transport vehicle. The support surface 12 is hereinshown as a grating 13 formed of transversely welded steel rods, herein transverse rods 13' extending transverse to the longitudinal axis 14 of the road vehicle and axial rods 13" extending in the direction of the longitudinal axis 14. Although only one of the front wheels 10 and rear wheels 11 are hereinshown it is to be understood that there are two of these wheels 10 connected to a front axle 15 and two wheels 11 connected to the rear axle 16 but for simplicity of illustration of the system as herein described only one wheel of the front pair of wheels 10 and one of the rear pair of wheels 11 is shown. It is also pointed out that the transport vehicle could be a railway vehicle or a tractor trailer type highway vehicle or any, other transport vehicle capable of using the system and method of the present invention. Further, when road vehicles are transported their transmission is usually placed in "park" or in a selected gear engagement. This keeps the vehicles more stable during transport.

Figure 5A:
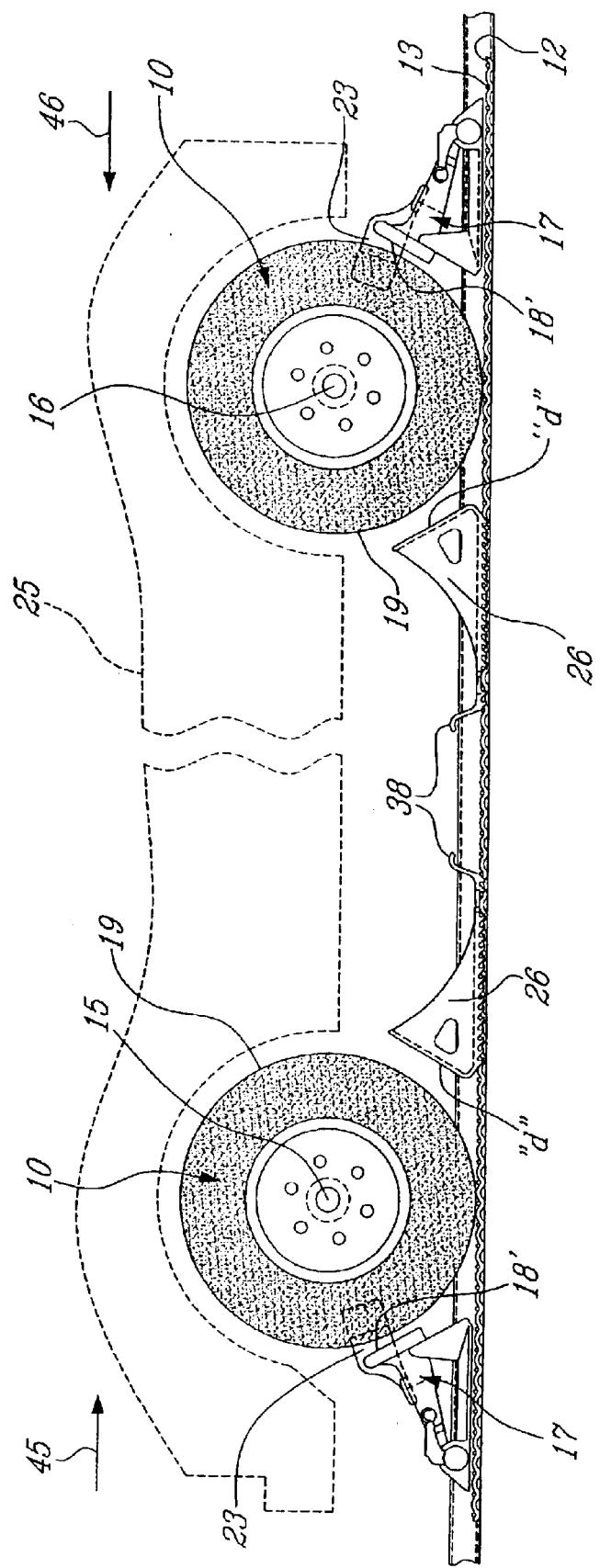
FIG. 5A is a side view showing a road vehicle restrained on a vehicle support surface of a transport vehicle by the method and system of the present invention using four primary wheel restraining devices and four catcher tire abutment devices.

The restraining system comprises, for each road vehicle being transported, four primary wheel restraining devices, herein the chucks 17 which are constructed in accordance with my previously referred to U.S. Pat. No. 5,302,063 and these comprise an arresting wall 18 which has an arresting outer surface 18' for contact with a tire thread 19 of the tire 10' of the wheel 10. As can be seen this arresting wall 18 is rearwardly inclined and extends upwardly from a lower front portion 20 of the chuck. The chuck or primary wheel restraining device 17 has a bottom wall 21 which is provided with securing means in the form of a plurality of teeth 22 (see FIG. 6) for engagement with the transverse rods 13' of the grating 13. These teeth constitute securing means for attaching the primary wheel restraining device 17 to the support surface. As hereinshown each chuck 17 is provided with a lateral restraining paddle 23 which extends adjacent a respective one of the inner surface 24 of each tire 10' whereby to prevent lateral displacement of the road vehicle during transport. There are four of these chucks 17 secured to the grating 13 and disposed with their arresting surface 18' positioned adjacent the thread face 19 on an outward side of the pair of wheels thereby establishing a transport location of a road vehicle 25 on the support surface 12 between the four primary wheel restraining devices 17 as shown in FIGS. 5A and 5B.

As also shown in FIG. 1 there are four catcher tire abutment devices 26 which are also provided with an arresting surface 27 and securing means for attaching same to the vehicle support surface 12 and at an approximate distance "d" adjacent the thread face 19 of a respective one of the four tires 10' but on an inward side of the pair of wheels.

Referring now more specifically to FIGS. 2 to 4B there will be described the construction of the catcher tire abutment device 26. As hereinshown, the device is a one piece device which is molded from structural plastic material and it has a flat bottom wall 28 and a rearwardly and upwardly sloping front wall 29 which defines the outer arresting surface 27, as more clearly shown in FIG. 3. A plurality of ribs 29' interconnect the front wall 29 and the bottom wall 28. Securement arresting means in the form of a plurality of rearwardly sloping teeth 30 extend rearwards of the bottom wall 28 for engagement in the grating 13. These teeth 30 are spaced apart in transverse equidistantly spaced rows 31 and are disposed for projection in the openings 13''' defined between the axial rods 13" and transverse rods 13' as shown in FIG 4A. These teeth 30 engage with the transverse rods 13' and the teeth are inclined whereby when the arresting front face 27 is contacted by a load in the direction indicated arrow 32 in FIG. 4A they will transmit the load into the transverse rods 13' of the grating 13 under the entire surface of the bottom. As also clearly illustrated in FIG. 4A, adjacent rows 31 of the teeth 30 define there between rearwardly inclined slots 33 which terminate in an arcuately shaped base 34 above the flat bottom wall 28 and these slots are dimensioned for close fit about an outer peripheral portion of the transverse rods 13' of the grating which are engaged by the teeth.

The catcher tire abutment device 26 is further provided with clamping means in the form of grating engagement means provided by arresting teeth 35 which depend from a lower surface 36 of a flexible tongue section 37 which is an extension of the bottom wall 28 projecting rearwardly thereof This tongue section 37 extends co-extensively with the bottom wall and is provided with an elevated handle 38 formed at a free end 39 thereof and extending upwardly whereby to facilitate grasping by a user's hand to flex the end portion of the tongue section upwardly for engagement and disengagement from the grating. As hereinshown the arresting teeth 35 slope towards the front wall 27 in a direction opposite to the clamping teeth 30. Therefore, in order to permit engagement of these arresting teeth 35 within the grating it is necessary to firstly position the clamping teeth 30 in engagement within the grating and then by foot pressure of otherwise, the arresting teeth are pressed within the openings of the grating by downward pressure. The handle 38 may also be at the same time lifted in the direction of arrow 40 to articulate the teeth 35. When it is necessary to remove the tire abutment device 26 from engagement with the grating it is only necessary to grasp the handle 38 and pull the handle in a forward and upward direction as illustrated by arrow 40 in FIG. 4A.

Figure 4A:
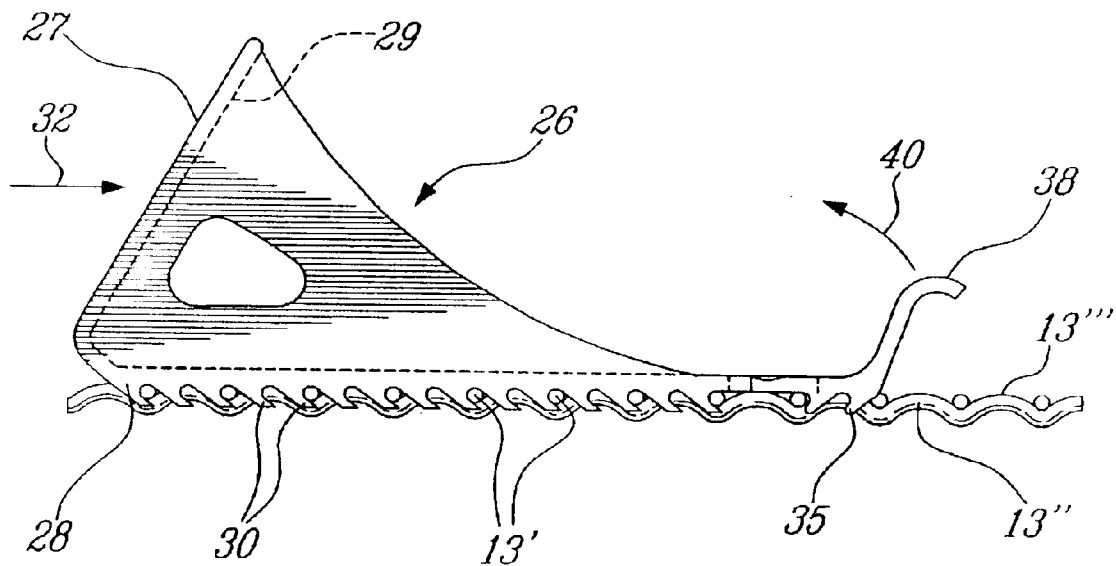
FIG. 4A is a side view showing the catcher tire abutment device of the present invention engaged in a metal grating support surface of a transport vehicle.
Figure 4B:
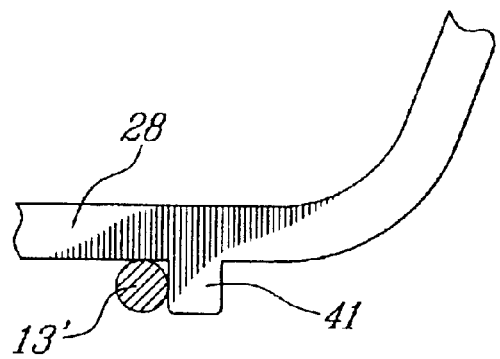
FIG. 4B is a fragmented side section view showing the construction of the clamping teeth.

It is pointed out that once the clamping teeth 30 are in engagement with the transverse rods 13' the arresting teeth 35 only prevent the catcher tire abutment device 26 from sliding out in a forward direction. Therefore, these arresting teeth 35 may be formed as downwardly projecting transversely extending teeth 41, as shown in FIG. 4B, and disposed for frictional engagement within the openings 13''' with a transverse rod 13' which is forwardly facing to the clamping teeth 30.

It is pointed out that the tongue section 37 need only flex very slightly to permit engagement and disengagement of the arresting teeth 35 or projections 41. It is also conceivable that this tongue section could be molded as a wall which is thinner at least in a section thereof to facilitate flexion.

With reference now to FIGS. 5A to 6 there will be described the method of operation of the system of the present invention. As previously described it consists of securing four primary wheel restraining devices 17 in line with the thread face 19 on an outward side of the pair of wheels 10 secured to the front and rear axles 15 and 16 of the vehicle 25. These primary wheel restraining chucks 17 are secured to the grating 13 slightly spaced from the tire thread surface as shown in FIG. 5A. Thereafter four catcher tire abutment devices 26 are likewise secured to the grating 13, in the manner as previously described, but these are spaced an approximate predetermined distance "d" from the thread surface 19 whereby to provide for the transported road vehicle 25 to dissipate its kinetic energy when subjected to an impact force from either from the front of the vehicle, in the direction of arrow 45, or from the back direction, as shown by arrow 46. The absorption of this kinetic energy from any of these directions works in the same manner as each wheel is disposed between an arresting surface of a primary wheel restraining device 17 and a catcher tire abutment device 26.

Referring now to FIGS. 5B and 6, it can be seen that when the vehicle 25 is displaced in a forward direction due to an impact of the transport vehicle in an opposed direction, the front wheels 10 secured to the front axle 15 will be directed against the arresting surface 18' of the front wall 18 of the primary wheel restraining devices 17 secured adjacent the front pair of wheels. Upon contact of the arresting surface 18' the tire 11 will compress and deform such as shown at 48 in FIG. 6 by displacing air within the tire and this will result in some absorption of the kinetic energy of the vehicle. At the same time, the wheels of the front axle 15 will move upwardly on the arresting surface 18' due to the rearward slope of the front wall of the arresting surface 18', as shown in FIGS. 5B and 6, and this upward movement is dictated by the distance "d" between the tires of the opposed wheels with the catcher tire abutment device. This distance "d" is less than the length of the arresting surface 18' of the primary wheel restraining device. The upward movement of the wheel and associated end of the transported road vehicle provides a downward restoring load "W", as illustrated by arrow 47 caused by the weight of the vehicle whereby to assist the road vehicle to return to its transport location as shown in FIG. 5A. It is pointed out that as the wheels 10 of the front axle 15 start moving upwardly the vehicle 25 moves forwardly causing its wheels 10 on the rear axle 16 to move also forwardly to contact the sloped arresting surface 27 of the catcher tire abutment device 26 thereby arresting the vehicle and causing the load to pull the vehicle down and restore itself between the slope surfaces of the primary wheel restraining devices 18 adjacent the front wheels and the slope faces of the primary wheel restraining devices adjacent the rear wheels. Because the vehicle transmission is usually in gear coupling, the vehicle will kickly stabilize in the transport location. The lateral restraining paddles 23 prevent lateral displacement during this motion.

It is pointed out that this system of restraining the transported vehicles when subjected to front or rear impact forces, provides for a longer time dissipation of the kinetic energy resulting in a soft dissipation of the impact force. This sequential action provides a longer time delay for absorbing the energy and is calculated as the time lapse in the displacement of the front wheels to engage the arresting surface 18', the time lapse in the deformation of the tire, the time lapse when the wheels move upwardly on the inclined face which is dictated by the time lapse of the rear wheels impacting on the inclined face of the catcher tire abutment devices 26 and any deformation in the tires of the rear wheels. Thereafter, the vehicle may oscillate back and forth on the wheels between the outer wheel chuck restraining devices 18 to finally stabilize therebetween.

It is within the ambit of the present invention to cover any obvious modifications of the preferred embodiment of the present invention described herein, providing such modifications fall within the scope of the appended claims.

What is claimed is:

1. A system for restraining a road vehicle on a vehicle support surface of a transport vehicle; said system comprising providing for each road vehicle, four primary wheel restraining devices having an arresting surface and securing means for attaching same to said vehicle support surface with said arresting surface positioned adjacent a thread face of a tire of front and rear pairs of wheels of said road vehicle and on an outward side of said pairs of wheels thereby establishing a transport location of said road vehicle on said vehicle support surface between said four primary wheel restraining devices; and four catcher tire abutment devices also having an arresting surface and securing means for attaching same to said vehicle support surface an approximate predetermined distance adjacent said thread face on an inward side of said pairs of wheels, said approximate predetermined distance being calculated whereby said arresting surface of said catcher tire abutment devices is contacted by said thread face of a pair of said wheels a predetermined time lapse after a vehicle at said transport location has been subjected to an axial impact force to permit said arresting surface of said primary wheel restraining devices to be contacted first by the tires of the wheels of one of said front and rear pair of wheels whereupon said tires compress against said arresting surfaces of said primary wheel restraining devices to absorb impact energy by deformation of said tires while causing said wheels and road vehicle to move upward whereby the weight of said road vehicle provides a downward restoring load to assist said road vehicle to return to said transport location when said arresting surface of said catcher tire abutment devices are contacted by the tires of the other pair of wheels.

2. A system as claimed in claim 1, wherein said arresting surface of said primary wheel restraining devices and of said catcher tire abutment devices are sloped rearwardly upwards from a bottom lower front portion of said devices.

3. A system as claimed in claim 2 wherein said securing means of each of said catcher tire abutment devices is provided by arresting means projecting from a bottom wall thereof for engagement with said vehicle support surface, and clamping means also engageable with said vehicle support surface.

4. A system as claimed in claim 3 wherein said arresting means is constituted by a plurality of rearwardly sloping teeth extending rearwards of said bottom wall for engagement with said vehicle support surface.

5. A system as claimed in claim 4 wherein said vehicle support surface, at least in an area where said road vehicle is to be transported, is constituted by a grating of transversely welded metal rods defining rectangular openings therebetween; said teeth being spaced apart in transverse equidistantly spaced rows and disposed for projection into at least some of said openings for engagement with at least some transverse ones of said rods.

6. A system as claimed in claim 5 wherein said clamping means comprises grating engagement means spaced from a rear lower edge of said bottom wall on a displaceable section whereby to cause said grating engagement means to project into some of said openings for engagement with some of said transverse rods after said teeth of said arresting means have been engaged to prevent displacement of said catcher tire abutment devices.

7. A system as claimed in claim 6 wherein said displaceable section is a projecting tongue section extending co-extensively with said bottom wall of said tire abutment device, and a handle formed at a free end of said projecting tongue section, at least said projecting tongue section being formed of flexible material, said handle permitting said grating engagement means to be engaged and disengaged with said some of said transverse rods by pushing said tongue section on said grating for engagement and pulling it away from said grating for disengagement.

8. A system as claimed in claim 7 wherein said grating engagement means is constituted by forwardly sloping teeth for engagement with said some of said transverse rods.

9. A system as claimed in claim 7 wherein said grating engagement means is constituted by downwardly projecting transversely extending teeth dimensioned for friction fit engagement in said rectangular openings of said grating.

10. A system as claimed in claim 7 wherein said catcher tire abutment devices are molded from a structural plastics material, said tongue section being dimensioned to flex upwardly by pulling upwards on said handle which is molded integrally therewith.

11. A system as claimed in claim 1 wherein said transport vehicle is a flatbed railway truck, said support surface being a substantially horizontal surface.

* * * * *